Aug. 6, 1940.  H. S. DRAPER ET AL  2,210,201

GAME DEVICE

Filed March 9, 1939  2 Sheets-Sheet 1

Inventors:
Harry S. Draper,
Harold R. Jones,
By Potter, Pierce & Schieffer
Attorneys Aug. 6, 1940.    H. S. DRAPER ET AL    2,210,201
GAME DEVICE
Filed March 9, 1939    2 Sheets-Sheet 2

Fig. 4.

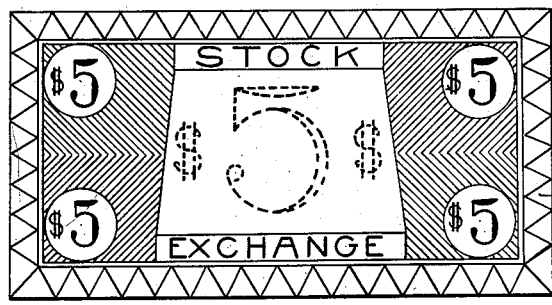

Fig. 3.

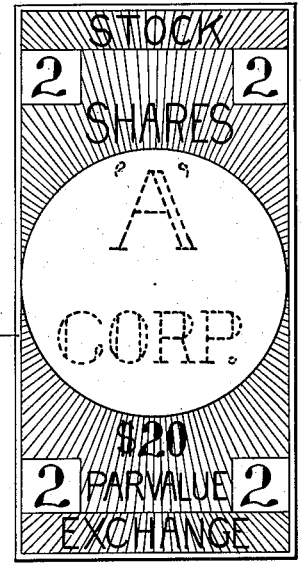

Fig. 5.

| | "STOCK EXCHANGE" STOCKS AND BONDS QUOTATION CHARTS | | | | | | | | | | | | | | | |
|---|---|---|---|---|---|---|---|---|---|---|---|---|---|---|---|---|
| 6 | SHARES 1 | 2 | 3 | 4 | 5 | 6 | 7 | 8 | 9 | 10 | 11 | 12 | 13 | 14 | 15 | 16 |
| PRICE SEE NO. ON RIM | 1 21 | 42 | 63 | 84 | 105 | 126 | 147 | 168 | 189 | 210 | 231 | 252 | 273 | 294 | 315 | 336 |
| | 2 22 | 36 | 66 | 72 | 110 | 108 | 154 | | | | | | | | | |
| | 3 23 | 34 | 69 | 68 | 115 | | | | | | | | | | | |
| | 4 24 | 32 | 72 | | | | | | | | | | | | | |
| | 5 25 | 30 | | | | | | | | | | | | | | |
| | 6 26 | | | | | (Values Continued) | | | | | | | | | | |
| | 7 27 | | | | | | | | | | | | | | | |
| | 8 28 | | | | | | | | | | | | | | | |
| | 9 29 | | | | | | | | | | | | | | | |
| | 10 30 | | | | | | | | | | | | | | | |

Fig. 6.

| "STOCK EXCHANGE" BROKER'S BLOCK PRICE CHART | |
|---|---|
| RED FIGURE PRICES | WHITE FIGURE PRICES |
| 1 BLOCK AT 1 - $ 600 | 1 BLOCK AT 1 - $ 600 |
| 1   "   "  2 - $ 660 | 1   "   "  2 - $ 540 |
| 1   "   "  3 - $ 690 | 1   "   "  3 - $ 510 |
| 1   "   "  4 - $ 720 | 1   "   "  4 - $ 480 |
| 1   "   "  5 - $ 750 | 1   "   "  5 - $ 450 |
| 1   "   "  6 - $ 780 | 1   "   "  6 - $ 420 |
| 1   "   "  7 - $ 810 | 1   "   "  7 - $ 390 |
| 1   "   "  8 - $ 840 | 1   "   "  8 - $ 360 |
| 1   "   "  9 - $ 870 | 1   "   "  9 - $ 330 |
| 1   "   " 10 - $ 900 | 1   "   " 10 - $ 300 |

Inventors:
Harry S. Draper,
Harold R. Jones,
By Potter, Pierce + Scheffler,
Attorneys.

Patented Aug. 6, 1940

2,210,201

UNITED STATES PATENT OFFICE 2,210,201

GAME DEVICE

Harry S. Draper and Harold R. Jones,
Warren, Ohio

Application March 9, 1939, Serial No. 260,853

3 Claims. (Cl. 273—141)

The present invention relates to game apparatus and particularly to a game adapted to simulate in its playing the execution of transactions in the stock market.

The primary object of the invention is to provide a game apparatus including a game board, stock price charts and stock and money certificates, the game board providing indicating means for designating the name and number of shares of stock of a particular company to be bought or sold in the play as well as a value indication which in cooperation with the price charts gives the price at which the stock is bought or sold.

Another object is to provide a novel form of indicating means which will determine by chance the transaction which the player will make.

Other objects and advantages of the invention will become apparent from the following detailed description of the apparatus and manner of playing the game and upon reference to the accompanying drawings forming a part hereof.

In the drawings:

Fig. 3 is a face view of a stock certificate forming part of the game apparatus, Fig. 4 is a face view of a certificate representing artificial money used in the game, Fig. 5 is a face view of a stock and bond quotation chart forming a part of the game apparatus, and Fig. 6 is a face view of a broker's block price chart forming part of the game apparatus.

Figure 1:
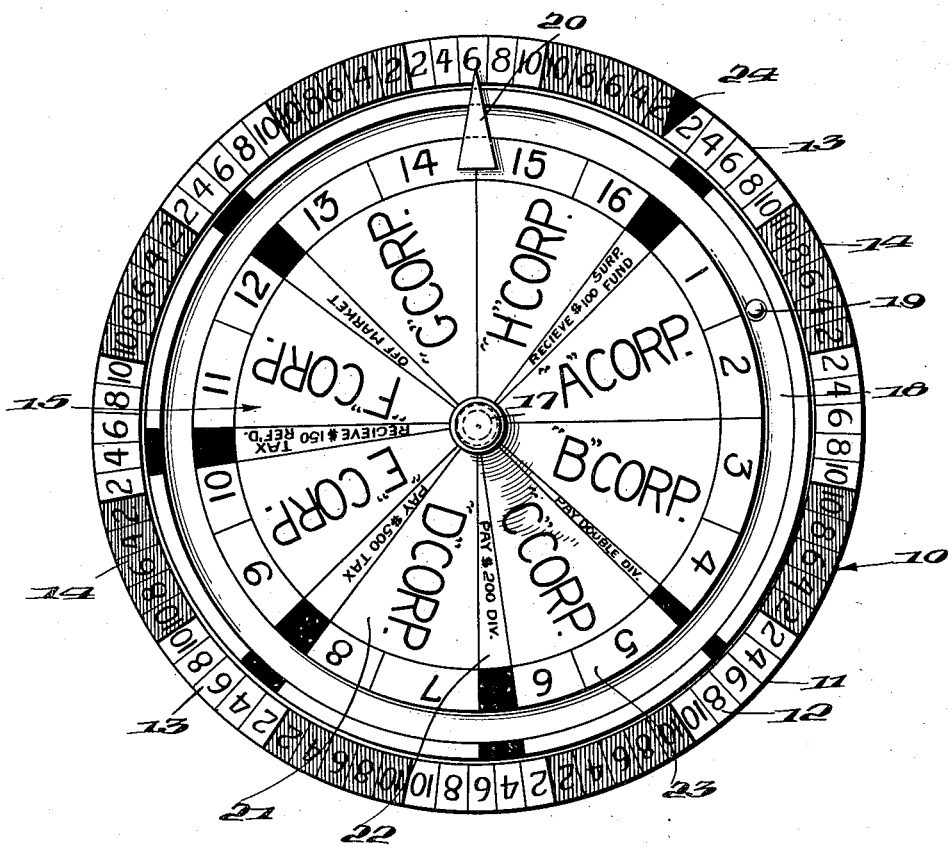
Fig. 1 is a plan view of a playing wheel forming part of the game apparatus.
Figure 2:
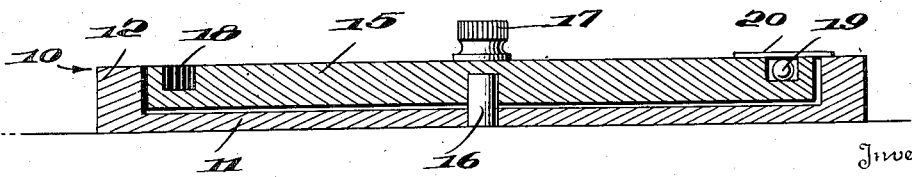
Fig. 2 is a central vertical section through the game wheel of Fig. 1.

Referring to the playing board 10 shown in Figs. 1 and 2, the same comprises a base 11, preferably circular in outline and provided with an annular upstanding peripheral rim 12. The upper edge or face of the rim 12 is flat and is divided into alternate white and red areas 13 and 14, respectively, these areas in turn being divided into five equal spaces, each bearing a number. The numbers in the spaces of each area ascend or descend by two's from two to ten and in the example shown, traveling in a clockwise direction, the numbers in the white areas ascend, while the numbers in the red areas descend so that adjacent numbers of each area are identical.

A spinning wheel or disk 15 is rotatably mounted on the base 11, within the confines of the rim 12, by means of an upright axial pin 16. An axially positioned knurled knob 17 fastened on the upper surface of the disk 15 is used for spinning the same.

The disk 15 is formed with an annular groove or channel 18 in its upper face adjacent the periphery thereof and a game piece in the form of a ball 19 is disposed therein, being free to roll around the channel incident to the spinning of the disk.

The disk 15 carries a pointer 20, the point of which extends beyond the periphery thereof so as to travel over the numbered spaces on the rim 12.

The central area of the face of the disc 15 is marked off into a plurality of segments 21 each designated by the name of a corporation, which names may be fictitious or the names of actual corporations, as desired. Between certain of the segments 21 are smaller segments 22 labeled "Pay $200 Div.," "Pay $500 Tax," etc., as indicated.

In the area surrounding the segments 21, the peripheral portion of the disk 15 is divided into a plurality of spaces 23, bearing numbers form 1 to 16 in consecutive order. An indicating arrow or pointer 24, mounted or marked on the rim 12 serves to select one of the numbers from 1 to 16 when the wheel stops after a player spins the same.

The stock certificate 25 shown in Fig. 3 is by way of illustration only, these taking and desired form. In the example shown, eight companies or corporations are represented on the playing board 10, however, more or less than this number may be represented as desired. Preferably there will be thirty shares of stock or bonds of each company, represented by certificates of various values although more or less than thirty shares of stocks or bonds may constitute a unit, as desired. The game employs coupons or certificates 26 representing $25,000.00 more or less in various denominations. It will be understood that these as well as the stock certificates are purely counterfeit and of no value aside from the game. A set of the charts 27 and 28, shown in Figs. 5 and 6 will be provided for each player.

Utilizing the physical appurtenances described above, the game is played as follows:

The idea of this game is for the players to speculate and invest in stocks and bonds until one player becomes the owner of all the negotiable stocks and bonds, and all the money left in the game.

Two to eight people can play. One person is chosen to act as broker.

Place the playing board on a fairly level table, place the ball in the groove and the board is ready for play.

All stocks and bonds and money are held by the broker at the beginning of the game.

The broker gives each player, no matter how many are playing, $4000 divided as follows, four $500, ten $100, ten $50, fifteen $20, eleven $10, fifteen $5, and fifteen $1 coupons. The remaining money is held by the broker.

The broker takes first spin, the game is on. The ball stops opposite a stock or bond, the arrow on the wheel will be pointing to a number in the red or white areas on the rim. This means that the player will buy the block of stocks or bonds at which the ball stopped at the price shown by the arrow. If the price is red he will pay the price shown on the red side of the block price chart 28. If it is white, he will pay the price shown on the white side of the price chart. This price is for the entire block as bought from the broker.

The first player's right hand neighbor now takes his turn. If this player's spin puts the ball opposite the stock bought in block by the first player he will buy from the first player as many shares as indicated by the large number on the wheel in the space 23 which stops opposite the arrow 24 on the rim. The price he will pay for these stocks or bonds is shown by the arrow 20 on the wheel using the numbers on the rim, then the total purchase price is obtained from the quotation chart 29. Thus; 10 shares of any stock or bond at 1 red or white, will cost (see quotation chart) $210.

However, if this player's spin puts the ball opposite a stock or bond which has not been bought from the broker, the player will buy this block from the broker at the price shown by the arrow on the wheel using the figures on the rim. If this figure is in the red, he will pay the red price, and if it is in the white, he will pay the white price on the chart 28. The red and white prices (chart 28) are used only when buying blocks of stocks or bonds from the broker. The same figures on the rim are used to indicate the price of shares which are on the market, the color being disregarded when buying from other players.

As the play progresses it will happen that a player will wish to buy more shares of a certain stock or bond than a seller has left. In this case the buyer may fill out his order by buying any other stock or bonds which the seller has for sale. A seller can only sell the stocks or bonds which he bought in block from the broker: He cannot sell any shares of a stock or bond which he has bought from his opponents until it is ready for retirement. If a seller in a case of this kind does not have any other stocks or bonds for sale with which to fill out the buyer's order, the buyer can only buy what the seller has left of the stock or bond shown by the wheel. This is termed "Selling Short." Thus, the buyer instead of getting, we will say, 10 shares at 6, can only buy six at 6 at a price of 84 dollars instead of 140 dollars.

This brings the game to where a player has sold all of a block of stocks or bonds, which makes this block ready for retirement so that it can begin collecting dividends.

The idea of the game at this point is for one player who holds shares of the block to be retired, to obtain all of the shares of the block to be retired by buying the shares of this block which are held by other players. This is done as follows: The last player to buy shares of the block to be retired, and the other players holding shares of this block take a turn at spinning the wheel, the last buyer spinning first. The player spinning the highest number of the large numbers on the wheel, as pointed out by the arrow on the rim, may buy all the shares of the block held by the other players at par value, that is at $20 per share. If the player getting the highest number does not have money enough to make the purchases from the other players, and cannot mortgage for enough, the next highest player may buy the shares and so on down the line. If no one of this group which spun for the block can make the purchase, then, the whole block is ruled off the market until one of the group collects enough to buy them. The first one of this group asking for these shares is allowed to make the purchases. When a player has bought all the shares of a block he retires the block and collects dividends on it each time an opposing player's spin puts the ball opposite to this stock or bond on the wheel. Eventually all of the blocks of stocks and bonds will be retired and paying dividends. Regular dividends are $100.00.

If a player's funds are running low and he cannot pay dividends, he may mortgage for enough to continue, receiving $300 from the bank for each retired block he mortgages. He does not turn the block over to the broker when it is mortgaged, but uses a mortgaged and retired card (not shown) with the mortgaged side up and leaves the block on the table where it can be seen. To lift a mortgage he pays the bank $350. All dividends on mortgaged stocks and bonds are paid to the bank and only whole blocks of stocks or bonds that have been retired can be mortgaged. If a player spins his own mortgaged stock or bond he pays a dividend to the bank.

It will sometimes happen that a player will have mortgaged all of his retired blocks and will have no money with which to continue but still has some shares of stocks or bonds for sale. These shares must be sold so that they can be collected into a block and retired. This is done in this way. The other players holding shares of this stock or bond spin the wheel to see who will buy all the shares at par value as explained under retiring for dividends. If a player has a whole block of stocks or bonds for sale and he is bankrupt all the other remaining players spin for the highest number of the large numbers which gives the highest player the privilege of buying the whole block from the seller at par value and retiring it to collect dividends on it. The seller then continues with the money he has received for the block until he is out of the game.

Thus by elimination one player will be left as winner of the game.

The small spaces on the wheel, such as "Pay $200 dividend" "Pay $500 tax" "Receive $150 tax refund" "Receive $100 surplus fund" explain themselves. This money is paid to and received from the bank.

The space "Off the market" means that when a player spins this space he is off the market for three turns around the table unless he at once pays $200 to the bank. If he chooses to remain off the market he can neither buy, sell, mortgage, pay, or receive dividends.

The space "Pay double dividends" only works after the first block of stocks or bonds has been retired. If a player spins this space before the first block of stocks or bonds is retired it is ignored. If a player spins this space after the first block has been retired he must pay $200 dividends to the other players each time he spins the ball on their retired stocks. Each time a player spins "Pay double dividends" he must pay to the other players double the dividends he was paying when he last spun this space. Thus, the first time he would pay $200 dividends, the second time $400, the third time, $800 and so on. The arrow 24 on the rim points all of these spaces.

If the ball stops on a stock or bond dividing line the player is allowed another spin. If the arrow on the rim points to a line between the large numbers on the wheel the player is allowed another spin. If the arrow on the wheel points to a line between the numbers on the rim such as on the line between 4 and 6 he buys his stock or bond at 5. If the arrow points between the two 2's he buys his stock or bond at 1. If the arrow points between the two tens he buys his stock or bond at 10.

While a preferred form of the apparatus, manner of designating plays and rules for playing the game have been illustrated and described, it will be understood that various alterations in some or all of these particulars may be resorted to without departing from the spirit of the invention within the scope of the appended claims.

I claim:

1. A game board of the character described comprising a substantially circular base member, an upstanding annular rim carried by said base member having value indicating indicia thereon, a rotatable member carried by said base coaxial with said rim, said rotatable member having an annular channel formed in the face thereof substantially concentric with the axis of rotation thereof, said rotatable member having play indicating indicia thereon, a movable game piece disposed in said annular channel and freely movable therein for cooperating with a portion of the indicia on said rotatable member to indicate part of a play, and means on said rotatable member and on said annular rim adapted each to indicate on the other data for completing a play.

2. In a game apparatus of the character described, a game board comprising a base, an annular upstanding rim carried by said base having value indicia thereon, a rotatable member carried by said base coaxial with said annular rim, said rotatable member having means for cooperating with the indicia on said rim for indicating a value for use in computing a play, said rotatable member having an annular channel formed in the upper face thereof and having thereon indicia relating to portions of a play and a freely movable game piece disposed in said channel adapted to cooperate with the indicia on said rotatable member for indicating a portion of a play.

3. A stock exchange game comprising a game board including a substantially circular base member having an upstanding peripheral rim divided into spaces with price indicia therein, a rotatable disk member carried by said base within the confines of said rim, said rotatable disk having an annular channel in its upper face spaced from the periphery thereof, the area of said disk within the bounds of said channel being divided into segments inscribed with the means of stocks, a freely movable game piece disposed in said channel for cooperating with said segments in designating the name of a stock to be involved in a play, the peripheral area of said disk being divided into spaces with indicia therein indicating numbers of shares, and said disk and said rim each having means for indicating on the other the price and number of shares of stock respectively involved in a play.

HARRY S. DRAPER.
HAROLD R. JONES.

CERTIFICATE OF CORRECTION.

Patent No. 2,210,201.　　　　　　　　　　　　　　　August 6, 1940.

HARRY S. DRAPER, ET AL.

It is hereby certified that error appears in the printed specification of the above numbered patent requiring correction as follows: Page 3, second column, line 29, claim 3, for the word "means" read --names--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.